United States Patent
Lee (10) Patent No.: US 11,958,381 B2
(45) Date of Patent: Apr. 16, 2024

(54) ELECTRIFIED VEHICLE AND POWER SOURCE MANAGEMENT METHOD THEREFOR

(71) Applicants: Hyundai Motor Company, Seoul (KR); Kia Corporation, Seoul (KR)

(72) Inventor: Jung Hyun Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/948,623

(22) Filed: Sep. 20, 2022

(65) Prior Publication Data

US 2023/0264599 A1 Aug. 24, 2023

(30) Foreign Application Priority Data

Feb. 21, 2022 (KR) .................. 10-2022-0022436

(51) Int. Cl.
*B60L 58/20* (2019.01)
*B60L 53/80* (2019.01)
*B60L 58/22* (2019.01)

(52) U.S. Cl.
CPC ............... *B60L 58/20* (2019.02); *B60L 53/80* (2019.02); *B60L 58/22* (2019.02); *B60L 2240/527* (2013.01); *B60L 2240/545* (2013.01)

(58) Field of Classification Search
CPC .......... B60L 58/20; B60L 58/22; B60L 53/80; B60L 2240/527; B60L 2240/545
See application file for complete search history.

(56) References Cited

U.S. PATENT DOCUMENTS 10,399,447 B2  9/2019  Ger

FOREIGN PATENT DOCUMENTS

| JP | 2012-120416 A | 6/2012 |
| JP | 2013-112303 A | 6/2013 |
| JP | 2014-147197 A | 8/2014 |
| KR | 100829308 B1 | 10/2008 |
| KR | 100954718 B1 | 4/2010 |
| KR | 102271612 B1 | 7/2021 |
| KR | 10-2023-0104461 A | 7/2023 |
| KR | 10-2023-0104462 A | 7/2023 |
| KR | 10-2023-0135940 A | 9/2023 |
| WO | 2004/079853 A2 | 9/2004 |

*Primary Examiner* — Robert L Deberadinis
(74) *Attorney, Agent, or Firm* — Fox Rothschild LLP (57) ABSTRACT

An electrified vehicle capable of additionally mounting a swappable battery and a power source management method for the same are provided. A method of power source management of an electrified vehicle is provided, comprising connecting a swappable battery unit to a connector in an electrified vehicle comprising a first battery fixedly arranged with a main battery unit, a first battery management system configured to control the first battery, and a DC converter having a first end and a second end, the swappable battery unit comprises a second battery, and a second battery management system configured to control the second battery. The method further comprises determining, using a vehicle control unit, a target integrated voltage to be supplied to a power electric unit, and transmitting, using the vehicle control unit, a voltage command corresponding to a target output voltage to the DC converter, according to a determined target integrated voltage.

19 Claims, 3 Drawing Sheets

ELECTRIFIED VEHICLE AND POWER SOURCE MANAGEMENT METHOD THEREFOR

CROSS REFERENCE TO RELATED APPLICATION(S)

The present application claims, under 35 U.S.C. § 119(a), the benefit of Korean Patent Application No. 10-2022-0022436, filed Feb. 21, 2022, the disclosure of which is incorporated herein by reference in its entirety.

BACKGROUND

Technical Field

Embodiments of the present disclosure relate to an electrified vehicle capable of additionally mounting a swappable battery and a power source management method therefor.

Description of the Related Art

Recently, as interest in the environment increases, electrified vehicles having an electric motor as a power source are also increasing.

Although many electrified vehicle users have driving patterns centered on a short-distanced city area, in electrified vehicles, since the battery charging time is relatively long compared to the refueling time of internal combustion engine vehicles, the maximum travel distance of the electric vehicle (EV) that is driven through one full charge is essential.

However, when the battery capacity is increased to maximize the travel distance of the EV, the weight of the vehicle is increased, as well as the battery price, in an electrified vehicle, causing the cost of the vehicle to be significantly increased.

To solve the problems such as reduced travel distance and the charging time due to battery deterioration, some manufacturers consider replacing the battery by making the battery detachable. In the case of small mobility, such as electric scooters, low voltage/low capacity batteries can be applied and replaced directly by users. Still, large-capacity batteries for vehicles require dedicated infrastructure as they are difficult to replace by users due to weight and safety issues. However, it is necessary to secure a site and replacement equipment at a significant cost to expand the infrastructure for battery replacement. Even if the infrastructure is constructed, there is a problem in that the driving by itself becomes difficult if there is a physical damage to the connection part or damage to a contact point when the number of replacements is accumulated.

SUMMARY

Objects of the present disclosure have been made in view of the above problems, and it is an object of the present disclosure to provide an electrified vehicle capable of additionally mounting a swappable battery and a method of power source management therefor.

In particular, an exemplary embodiment of the present disclosure provides an electrified vehicle capable of varying the voltage supplied to a power electric system using a swappable battery and a power source management method therefor.

Technical objects to be achieved by the present disclosure are not limited to the technical objects described above, and other technical objects not described will be clearly understood by those skilled in the art to which the present disclosure pertains.

To accomplish the above objects, according to an object of the present disclosure, there is provided a method of power source management of an electrified vehicle. The method comprises connecting a swappable battery unit to a connector in an electrified vehicle. The electrified vehicle may comprise a first battery fixedly arranged with a main battery unit, a first battery management system configured to control the first battery, and a DC converter having a first end and a second end and electrically connected in series with the main battery unit at the first end. The swappable battery unit may comprise a second battery, and a second battery management system configured to control the second battery. The connector may be provided at the second end of the DC converter. The method may further comprise determining, using a vehicle control unit, a target integrated voltage to be supplied to a power electric unit, comprising an inverter and a motor based on first battery information on the first battery and second battery information on the second battery, and transmitting, using the vehicle control unit, a voltage command corresponding to a target output voltage to be output by stepping up or stepping down the voltage of the second battery, at the second end of the DC converter, to the DC converter, according to a determined target integrated voltage.

For example, the method may further comprise acquiring, by the first battery management system, the second battery information from the second battery management system when the swappable battery unit is connected to the connector.

For example, the method may further comprise acquiring, by the first battery management system, the second battery information via the DC converter.

For example, the method may further comprise, when the existing integrated voltage that is the sum of the existing voltage of the first battery and the current output voltage of the DC converter is lower than the target integrated voltage, determining, using the vehicle control unit, whether an additional step-up in the DC converter is possible.

For example, the method may further comprise controlling to maintain an existing conversion ratio of the DC converter when the additional step-up of the DC converter is impossible.

For example, the method may further comprise disconnecting the connection between the DC converter in the vehicle control unit and the main battery unit when the second battery reaches a predetermined discharge limiting state.

For example, the method may further comprise controlling the vehicle control unit to supply power to the power electric unit by the main battery unit independently when the DC converter and the main battery unit are disconnected.

For example, the method may further comprise redetermining a target integrated voltage in the vehicle control unit when the additional step-up of the DC converter is possible.

For example, the swappable battery unit may further comprise a cooling fan, and the method may further comprise controlling an operation of the cooling fan based on the temperature of the second battery and a vehicle speed as a voltage conversion through the DC converter in the second battery management system.

In addition, an electrified vehicle according to an exemplary embodiment of the present disclosure is provided. The electrified vehicle may comprise: an power electric unit comprising a motor and an inverter; a main battery unit electrically connected to the power electric unit and comprising a first battery and a first battery management system configured to control the first battery, and disposed fixedly in the electrified vehicle; a DC converter having a first end and a second end, configured to output power to a second end input, through a connector, by stepping up or stepping down power, when a swappable battery unit electrically connected, in series, with the main battery unit, with the connector at the second end, a second battery management system configured to control the second battery, wherein the second battery is connected to the connector; and a vehicle control unit configured to determine a target integrated voltage to be supplied to the power electric unit and transmits a voltage command corresponding to the target output voltage to be output from the one end of the DC converter to the DC converter according to the target integrated voltage.

For example, the first battery management system may be configured to acquire a second battery information output from the second battery management system when the swappable battery unit is connected to the connector.

For example, the first battery management system may be configured to acquire second battery information via the DC converter.

For example, when the currently integrated voltage, the sum of the existing voltage of the first battery, and the existing output voltage of the DC converter is lower than the target integrated voltage, the vehicle control unit may be configured to determine whether an additional step-up in the DC converter is possible.

For example, the vehicle control unit may be configured to maintain an existing conversion ratio of the DC converter when an additional step-up in the DC converter is impossible.

For example, the vehicle control unit may be configured to disconnect the connection between the DC converter in the vehicle control unit and the main battery unit when the second battery reaches a predetermined discharge limiting state.

For example, the vehicle control unit may be configured to control the main battery unit to independently supply power to the power electric unit when the DC converter and the main battery unit are disconnected.

For example, the vehicle control unit may be configured to redetermine the target integrated voltage when the additional step-up in the DC converter is possible.

For example, the swappable battery unit may further comprise a cooling fan, wherein the second battery management system may be configured to control the operation of the cooling fan based on the temperature of the second battery and the vehicle speed as a voltage conversion through the DC converter in the second battery management system.

According to various embodiments of the present disclosure, as described above, an unnecessary increase in vehicle price or weight may be prevented by allowing a swappable battery to be additionally mounted and the main battery.

In addition, acquiring a mounted swappable battery state through various methods and integrally managing the main battery and energy.

In addition, considering the efficiency of the power electric system, various ranges of voltage may be provided to the power electric system.

The effects of the present disclosure are not limited to the above-described effects and other effects which are not described herein will become apparent to those skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, embodiments of the present disclosure will be described in greater detail with reference to the accompanying drawings. In describing the present disclosure, for ease of understanding, the same reference numerals are used to denote the same components throughout the drawings, and repetitive description on the same components will be omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

In addition, a unit or a control unit in a name such as a hybrid control unit (HCU) and a vehicle control unit (VCU) is a term widely used in the name of controller that controls a vehicle-specific function and does not imply to a general function unit. For example, each controller is a communication device that communicates with other controllers or sensors to control the function that is responsible for, a memory that stores an operating system or logic commands and input/output information, and one or more processor that performs determination, calculation, decision, and the like, which is necessary for the control the function that is responsible therefor.

According to an embodiment of the present disclosure, it is proposed to manage the power of a main battery and power of the swappable battery by connecting a swappable battery with a main battery electrically connected to a driving motor in an electrified vehicle. In particular, when the power of the swappable battery is supplied to the power electric (PE) system, it is proposed that the voltage is varied through a DC converter. The DC converter is connected to the main battery in series to sum up the output voltage of the DC converter and the voltage of the main battery. Accordingly, the voltage supplied to the power electric system may be varied to be higher than the voltage of the main battery.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
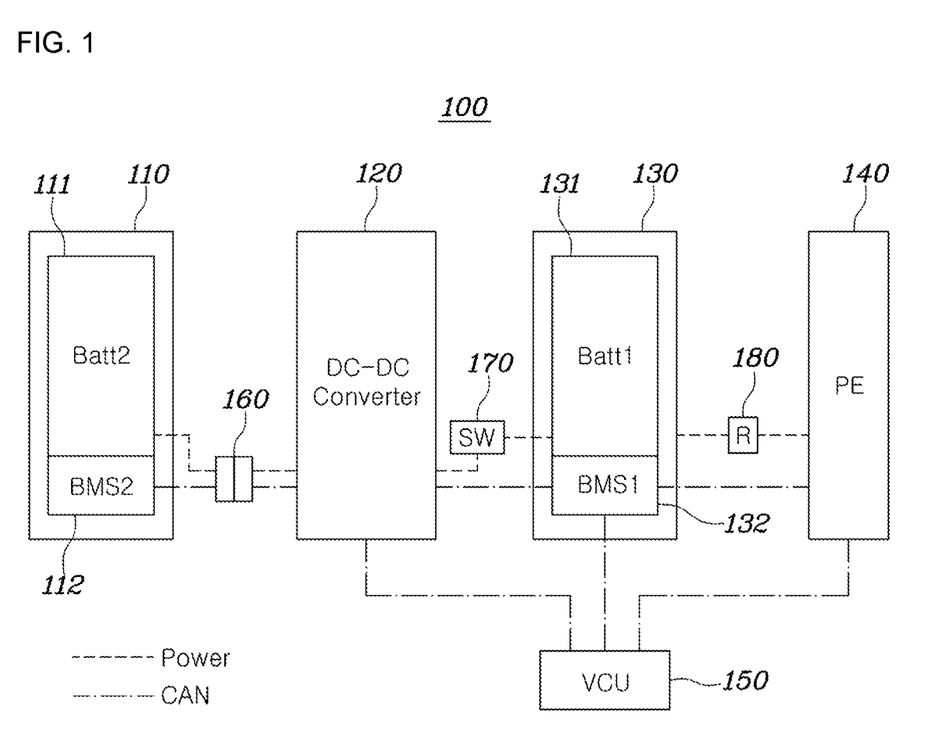
FIG. 1 is a block diagram showing an example of an electrified vehicle equipped with a swappable battery according to an embodiment of the present disclosure.

First, a configuration of an electrified vehicle according to an embodiment is described by referring to FIG. 1.

FIG. 1 is a block diagram showing an example of an electrified vehicle equipped with a swappable battery according to an embodiment of the present disclosure.

Referring to FIG. 1, an electrified vehicle 100, according to an embodiment, may include a swappable battery unit 110, a DC converter 120, a main battery unit 130, a power electric (PE) unit 140, a vehicle control unit (VCU) 150, a connector 160, a switch 170, and a main relay 180.

FIG. 1 is a view mainly showing components related to an embodiment, and it is apparent that more or fewer components may be included in the actual vehicle implementation. Hereinafter, each component will be described.

The swappable battery unit 110 may include a second battery 111 and a second battery management system (BMS) 112. The second BMS 112 may be configured to manage voltage, current, temperature, state of charge (SOC), and state of health (SOH) and may be configured to control the charging and discharging of the second battery 111. In addition, the second BMS 112 may be configured to set and manage the upper and lower limits of the SOC and may be configured to store information on cell type and a rated capacity of the second battery 111. In addition, the second BMS 112 may be configured to transmit the information on the second battery 111 to the outside (i.e., the DC converter 120) through a predetermined vehicle communication protocol (e.g., controller area network, CAN) and may be configured to receive a command on charging and discharging of the second battery 111. For convenience, the vehicle communication protocol may be assumed as the CAN communication in the following description, but it is apparent to those skilled in the art that the protocol may be replaced by other protocols, such as flexible data-rate (CAN-FD) and Ethernet.

Although not shown in FIG. 1, a cooling device for cooling the second battery in the swappable battery unit 110, for example, an air-cooled fan may be provided. In this case, the second BMS 112 may be configured to control the state of the second battery 111 or the operation state according to the vehicle speed. Of course, the swappable battery unit 110 may be implemented by a natural cooling method, or a cooling pad through which cooling water circulates may be disposed at a part where the swappable battery unit 110 is mounted in the vehicle to be cooled by the water cooling.

Meanwhile, the swappable battery unit 110 may be mounted on the roof of the electrified vehicle, accommodated in the space of a trunk or under the vehicle, and may be connected to the vehicle as in the form of a trailer by providing the separate wheel, the above example is exemplary, and the present disclosure is not limited thereto.

The swappable battery unit 110 may be connected to the DC converter 120 through the connector 160. According to an exemplary embodiment, the DC converter has a first end and a second end, and the connector may be connected at the second end. Here, being connected refers to a high-voltage power cable and CAN communication lines are connected respectively. In addition, the connector 160 is connected to an input terminal of the DC converter 120, and an output terminal of the DC converter 120 may be connected to the main battery unit 130 in series.

The DC converter 120 may be a high DC-DC converter (HDC) type that steps up the voltage of the second battery 111 according to the voltage of the second battery 111 and may be a low DC-DC converter (LDC) type that steps down the voltage of the second battery 111. For example, when assuming that the second battery 111 of the swappable battery unit 110 is smaller than that of the first battery 131 of the main battery unit 130, that is, when assuming that as a low voltage/low capacity, the voltage of the second battery 111 may be stepped up, and is provided as the HDC type.

In addition, the DC converter 120 may be configured to relay communications between the second BMS 112 of the swappable battery unit 110 and a first BMS 132 of the main battery unit 130 and may vary an output voltage by step up or step down the voltage of the second battery 111 according to the target voltage command of the VCU 150.

Further, an output terminal of the DC converter 120 may be connected to the main battery unit 130 in series and allows supply by adding an output voltage of the DC converter 120 and an output voltage of the first battery 131 of the main battery unit 130, to the PE unit 140.

The main battery unit 130, as shown, may include the first battery 131 and the first BMS 132 and is preferably fixedly mounted on the vehicle at all times. When the first battery BMS 132 starts to turn on (e.g., IG On, EV Relay, etc.), the first BMS 132 may be configured to acquire the state information of the second battery 111 from the DC converter 120, in which the state information is transmitted from the second BMS 112 to the DC converter, and determine the total energy of the first battery 131 and the second battery 111. If the second BMS 112 provided only cell type information and rated capacity information without providing the SOC or SOH, the first BMS 132 may be configured to estimate the SOC and SOH of the second battery 111 based on the provided information. Those above will be described later with reference to FIG. 3.

The main battery unit 130 may be connected to the PE unit 140, and the PE unit 140 may include a motor and an inverter (not shown).

The VCU 150 may be configured to determine the required driving force based on an accelerator pedal position sensor (APS) value of the APS, determine the driving torque or regenerative braking torque to be output by the motor of the PE unit 140, and transmit the torque command to the motor controller (not shown) or an inverter (not shown). In addition, the VCU 150 may be configured to acquire the state information and the total available energy information of each of the first battery 131 and the second battery 111 received from the first BMS 132. The VCU 150 may be configured to acquire output voltage information on the DC converter 120 and information of the efficiency of the voltage of the second battery 111 to the respective output voltage. Here, the voltage efficiency of the second battery 111 to the respective output voltage may be tabulated, and the table may be prepared in advance to the VCU 150 instead of transmitting the DC converter 120.

In addition, the VCU 150 may be configured to determine an optimal efficiency voltage capable of operating the optimal efficiency of the PE system, that is, the PE unit 140, and transmit a target voltage command corresponding thereto to the DC converter 120. For example, the VCU 150 may be configured to obtain a target voltage by subtracting the voltage of the first battery 131 from the optimum efficiency voltage or may be configured to obtain a target voltage by adding a predetermined margin from the voltage of the first battery 131 from the optimum efficiency voltage but is not limited thereto.

On the other hand, in the integrated energy management of the first battery 131 and the second battery 111, control is required in consideration of the characteristics of the second battery 111, which is swappable. In general, it is due to the high voltage battery system. The main battery, including cells having the same cell type and SOH, is used. Thus, when the swappable battery is connected, the main battery may have different voltages, cell types, and degradation degrees.

Table 1 below shows a combination of various main batteries and swappable batteries.

TABLE 1

| Case | Main battery | Swappable battery | Capacity | SOH | Remarks |
|---|---|---|---|---|---|
| 1 | NCM811 (800 V/73 kwh) | NCM811(NCM811 + α combination (high Nickel Li-ion Battery | 30 kwh | 100% | Same cell type Different capacity, same SOH |
| 2 | | NCM811 (Different ratio between NE cell to combination) | 32 kwh | 100% | Different cell type Different capacity, same SOH |
| 3 | | Lithium ferro-phosphate (LFP) | 20 kwh | 100% | Different cell type Different capacity, same SOH |

TABLE 1-continued

| Case | Main battery | Swappable battery | Capacity | SOH | Remarks |
|---|---|---|---|---|---|
| 4 | | NCM622 (Renewable battery application) | 25 kwh | 70% | Different cell type Different capacity, different SOH |

In Table 1, NCM is a composition of battery cathode material and may be referred to as nickel, cobalt, and manganese in order, three digits followed by NCM represent the component ratio expressed in the decile. That is NCM881 battery may be defined as the cathode material of Nickel:Cobalt:Manganese ratio of 8:1:1.

Referring to Table 1, various exemplary combinations are shown in which at least one of a cell type, a capacity, and a SOH is different between the main battery and the swappable battery.

As described above, the type or state of each battery may differ, and the total available energy may vary depending on the conversion efficiency according to the output voltage of the DC converter 120 and the existing voltage of the second battery 111. Therefore, the VCU 150 may be configured to determine the total available energy in consideration of the characteristics of the second battery 111 and the conversion efficiency of the DC converter 120 and determine the travelable distance according to the determination, thereby providing more accurate information on the total travelable distance to the driver.

On the other hand, as shown in FIG. 1, a switch 170 may be disposed on high voltage power cables between the DC converter 120 and the main battery unit 130, and a main relay 180 may be provided on the high voltage power cables between the main battery unit 130 and the PE unit 140.

A power source management method of an electric vehicle according to an embodiment based on the above-described vehicle configuration will be described with reference to FIG. 2.

Figure 2:
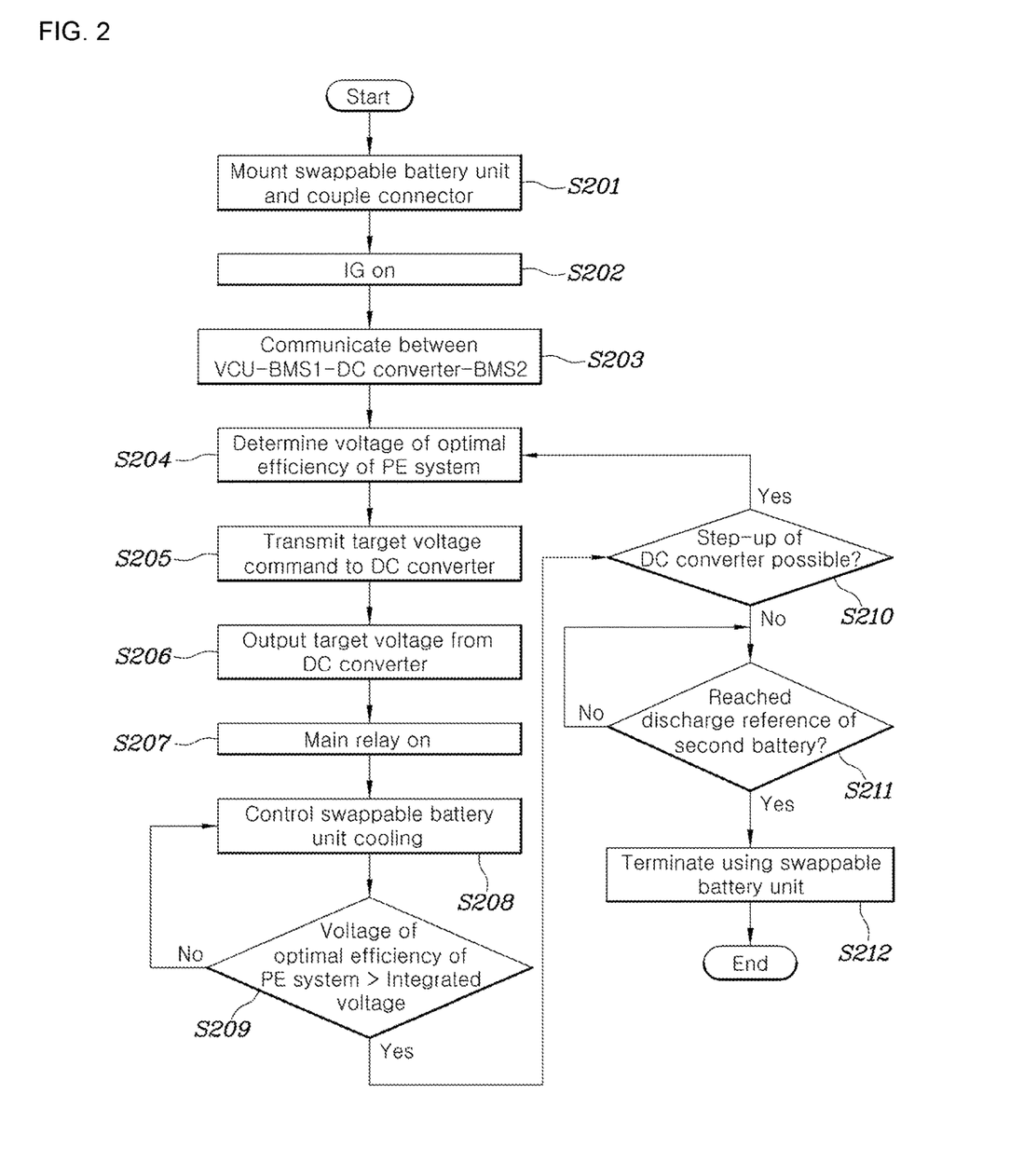
FIG. 2 is a flowchart showing an example of a method of power source management for an electrified vehicle according to an embodiment of the present disclosure.

FIG. 2 is a flowchart showing an example of a method of power source management for an electrified vehicle according to an embodiment of the present disclosure.

Referring to FIG. 2, the swappable battery unit 110 is mounted on an electrified vehicle 100. The connector 160 connected to the DC converter 120 may be coupled (i.e., connecting a high voltage power cable to a communication line) (S201).

When the engine is turned on after the swappable battery unit 110 is connected (S202), electrical components, including the second BMS 112, the DC converter 120, the first BMS 132, and the VCU 150, are turned on to start communication, and information exchange may be performed accordingly (S203).

More specifically, the second BMS 112 may be configured to transmit information (SOC, SOH, temperature, voltage, and the like) of the second battery 111 to the DC converter 120. The DC converter 120 may be configured to transmit the corresponding information to the first BMS 132. In addition, the first BMS 132 may be configured to determine the total available energy based on the SOC of the second battery 111 and the SOC of the first battery 131. In addition, the VCU 150 may be configured to determine the total travelable distance based on the information held by the first BMS 132.

If the second BMS 112 is configured to output only limited information such as cell type information and rated capacity information without directly outputting the SOC, SOH information, such as cell management unit (CMU) type, the first BMS 131 may be configured to estimate information of the second battery 111. Those above will be described with reference to FIG. 3.

Figure 3:
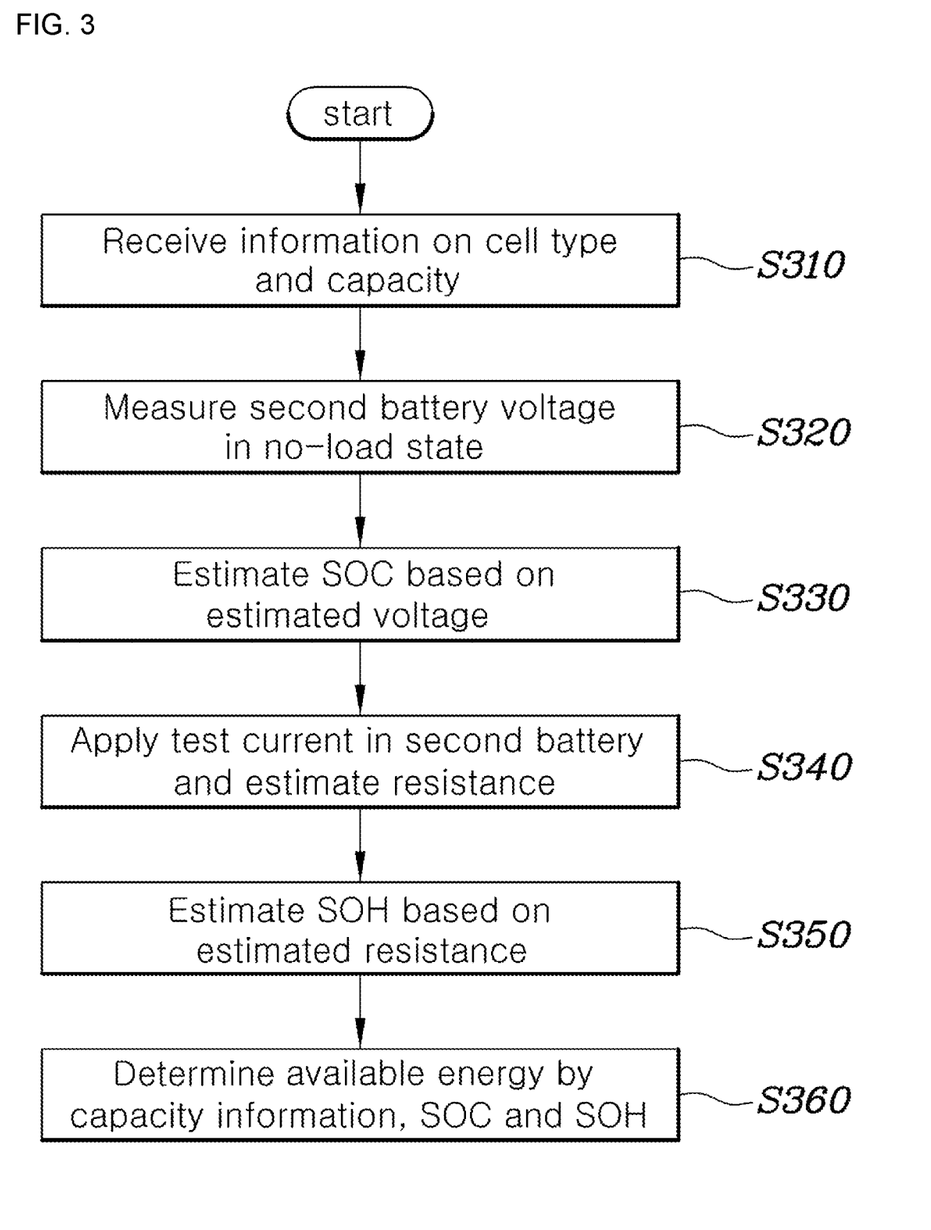
FIG. 3 is a flowchart showing an example of an estimation of a second battery state of a swappable battery unit according to an embodiment of the present disclosure.

FIG. 3 is a flowchart showing an example of an estimation of a second battery state of a swappable battery unit according to an embodiment of the present disclosure.

Referring to FIG. 3, firstly, the first BMS 132 may be configured to receive cell type information and rated capacity information of the second battery 111 from the second BMS 112 via the DC converter 120 (S310).

After that, the first BMS 132 may be configured to measure the voltage of the second battery 111 in the no-load state (S320) and estimate the SOC based on the measured voltage (S330). To this end, the first BMS 132 may be configured to retain and refer to a table in which the SOC for an open circuit voltage (OCV) is defined for each cell type information (NCM x/y/z, LFP, etc.).

In addition, the first BMS 132 may be configured to measure the internal resistance of the second battery 111 by applying a test current of a predetermined magnitude to the second battery 111 (S340) and may be configured to estimate the SOH based on the measured resistance (S350). To this end, the first BMS 132 may be configured to retain and refer to a table in which the SOH for resistance value is defined for each cell type information (NCM x/y/z, LFP, etc.). In contrast, in estimating the SOH, various methods, including charging the second battery 111 with a constant power, applying the amount of charging applied or a voltage increase with respect to the time applied may be used.

The first BMS 132 may be configured to determine the available energy of the second battery 111 based on the SOC and SOH and the received rated capacity information (S360).

Referring to FIG. 3, the method described above is preferable to apply in an environment where the cell type of the second battery 111 provided in the swappable battery unit 110 is standardized. Due to the application of the SOC-OCV table and SOH-resistance value table for each cell type, the first BMS 132 required to be standardized may be ensured. If the cell type information indicates a cell type that is not predetermined in the table, the first BMS 132 may be configured to notify the VCU 150 for such a situation to display a warning message.

In FIG. 2, the VCU 150, based on the information acquired from the communication step (S203), may be configured to determine an optimal efficiency PE system voltage capable of providing optimal efficiency for driving the PE unit 140 (S204). That is, the VCU 150 may be configured to determine the optimal efficiency for PE system voltage within the integrated voltage obtained by summing the voltage of the second battery 111 and available output voltage of the DC converter 120 based on the conversion ratio of the DC converter 120, and the voltage of the second battery 111, and the first battery 132. For example, assuming that the conversion ratio of the DC converter 120 is a maximum of three times, which is an HDC type, the voltage of the second battery 111 is 48 V, and the voltage of the first battery is 700 V, then the range of the integrated voltage may be from 748 V to 844 V. The voltage of the optimal efficiency of the PE system may be in the form of referring to the predetermined efficiency map, but this is exemplary and not necessarily limited thereto.

The VCU 150 may be configured to transmit the target voltage command to the DC converter 120 to satisfy the determined voltage of the optimal efficiency of the PE system (S205).

Accordingly, the DC converter 120 may step up or step down the voltage of the second battery 111 according to the type to satisfy the target voltage command to be output at the output terminal (S206).

When the sum voltage reaches the voltage of the optimal efficiency of the PE system, the main relay 180 is short-circuited to supply power to the PE unit 140 (S207).

As the power supply starts, a cooling control of the swappable battery unit 110 may be performed (S208). According to an embodiment, the cooling control may be in the form using a temperature/vehicle speed-based cooling map. For example, when the swappable battery unit 110 has a cooling fan as a cooling means, the second BMS 112 may be configured to control the cooling fan by referring to the cooling map as shown in Table 2 below.

TABLE 2

| Temperature ° C. | Vehicle speed | | | |
|---|---|---|---|---|
| | A | A + 5 | A + 10 | A + ... (Maximum speed) |
| Minimum cooling start temperature | X | X + y | X + y1 | X + y2 |
| T + 5 | X1 | X1 + y' | X1 + y1' | X1 + y2' |
| T + 10 | X2 | X2 + y'' | X1 + y1'' | X1 + y2'' |
| T + ... (Maximum temperature of battery) | X3 | X2 + z | X1 + z1 | X1 + z2 |

Referring to Table 2, the cooling map may have a form in which a stage of operation or duty of the cooling fan is defined according to a plurality of temperature ranges and a range of vehicle speed. However, various changes and modifications within an idea and a scope of the present disclosure can be clearly understood by those skilled in the art, which is exemplary.

A voltage drop may occur when the first battery 131 and the second battery 111 are discharged according to vehicle operation. Accordingly, the VCU 150 may be configured to monitor the integrated voltage (S209) and determine whether the DC converter 120 may be configured to additionally increase the output voltage when the voltage of the optimal efficiency of the PE system is lower (Yes in S209) (S210).

If an additional step-up of the voltage is possible (Yes in S210), the VCU 150 may be configured to determine the voltage of the optimal efficiency of the PE system again in the current situation (S204).

Contrarily, if the DC converter 120 has already been operating at the maximum step-up limit, additional step-up is impossible (No in S210). The step-down causes a drop in the integrated voltage and needs more current to provide the same power to the PE unit 140. It accelerates the consumption of the SOC of the first battery 131. Accordingly, the VCU 150 may be configured to maintain the operating state of the DC converter 120 until a predetermined discharge reference of the second battery 111 is reached (S211). The discharge reference may be set to a SOC or a voltage.

When the state of the second battery 111 reaches a discharge reference (Yes in S211), the VCU 150 may be configured to turn off the switch 170 to disconnect the swappable battery unit 110 and the DC converter 120 to terminate the use of the swappable battery unit 110 (S212) and supply the power of the first battery 131 to the PE unit 140.

According to the embodiments described so far, as the output terminal of the DC converter 120 is connected in series to the main battery unit 130, an integrated voltage greater than the voltage of the first battery 131 of the main battery unit 130 may be implemented.

Accordingly, even if the voltage of the optimal efficiency of the PE system is higher than the voltage of the first battery 131, an integrated voltage corresponding to the voltage of the optimal efficiency of the PE system may be supplied to the PE unit 140 within step-up/step-down range of the DC converter 120.

In addition, in supplying the same power to the PE unit 140, the voltage increases compared to the case where the main battery unit 130 is used independently, and the current is reduced. Accordingly, the speed of SOC reduction of the first battery 131 may be slowed.

On the other hand, the described present disclosure may be implemented as computer-readable code on a medium on which a program is recorded. The computer-readable medium may include recording devices in which data readable by a computer system is stored. Examples of computer-readable medium include hard disk drive (HDD), solid-state disk (SSD), silicon disk drive (SDD), ROM, RAM, CD-ROM, magnetic tape, floppy disk, optical data storage device, and the like. Therefore, the above embodiments are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method of power source management of an electrified vehicle, the method comprising:
connecting a swappable battery unit to a connector in an electrified vehicle,
wherein:
the electrified vehicle comprises:
a first battery fixedly arranged with a main battery unit;
a first battery management system configured to control the first battery; and
a DC converter having a first end and a second end and electrically connected in series with the main battery unit at the first end,
the swappable battery unit comprises:
a second battery; and
a second battery management system configured to control the second battery, and
the connector is provided at the second end of the DC converter;
determining, using a vehicle control unit, a target integrated voltage to be supplied to a power electric unit, comprising an inverter and a motor based on first battery information on the first battery and second battery information on the second battery; and
transmitting, using the vehicle control unit, a voltage command corresponding to a target output voltage to be output by stepping up or stepping down a voltage of the second battery, at the second end of the DC converter, to the DC converter, according to a determined target integrated voltage.

2. The method of claim 1, further comprising:
acquiring, by the first battery management system, the second battery information from the second battery management system when the swappable battery unit is connected to the connector.

3. The method of claim 2, comprising:
acquiring, by the first battery management system, the second battery information via the DC converter.

4. The method of claim 1, further comprising:
when an existing integrated voltage is the sum of an existing voltage of the first battery and a current output voltage of the DC converter is lower than the target integrated voltage, determining, using the vehicle control unit, whether an additional step-up in the DC converter is possible.

5. The method of claim 4, further comprising:
controlling an existing conversion ratio of the DC converter to be maintained when the additional step-up of the DC converter is impossible.

6. The method of claim 5 further comprising:
disconnecting the connection between the DC converter and the main battery unit when the second battery reaches a predetermined discharge limiting state.

7. The method of claim 6 further comprising:
controlling the vehicle control unit to supply power to the power electric unit by the main battery unit independently when the DC converter and the main battery unit are disconnected.

8. The method of claim 4, further comprising:
redetermining, by the vehicle control unit, a target integrated voltage when the additional step-up of the DC converter is possible.

9. The method of claim 1, wherein the swappable battery unit comprises a cooling fan, and further comprising:
controlling, by the second battery management system, an operation of the cooling fan based on a temperature of the second battery and a vehicle speed as a voltage conversion through the DC converter is performed.

10. A computer-readable recording medium configured to record a program for executing the power source management method of the electrified vehicle according to claim 1.

11. An electrified vehicle comprising:
a power electric unit comprising a motor and an inverter;
a main battery unit electrically connected to the power electric unit and comprising:
 a first battery; and
 a first battery management system configured to control the first battery and disposed fixedly in the electrified vehicle;
a DC converter, having a first end electrically connected in series with the main battery unit and a second end, configured to output power to the first end by stepping up or stepping down input power from the second end when a swappable battery unit is electrically connected with a connector at the second end;
a second battery management system configured to control a second battery, wherein the second battery is connected to the connector; and
a vehicle control unit configured to:
 determine a target integrated voltage to be supplied to the power electric unit; and
 transmit a voltage command corresponding to a target output voltage to be output from the second end of the DC converter to the DC converter according to the target integrated voltage.

12. The electrified vehicle of claim 11, wherein the first battery management system is configured to acquire a second battery information output from the second battery management system when the swappable battery unit is connected to the connector.

13. The electrified vehicle of claim 11, wherein the first battery management system is configured to acquire second battery information via the DC converter.

14. The electrified vehicle of claim 11, wherein the vehicle control unit is configured to determine whether an additional step-up in the DC converter is possible when an existing integrated voltage, that is, a sum of the existing voltage of the first battery and a current output voltage of the DC converter, is lower than the target integrated voltage.

15. The electrified vehicle of claim 14, wherein the vehicle control unit is configured to maintain an existing conversion ratio of the DC converter when an additional step-up in the DC converter is impossible.

16. The electrified vehicle of claim 15, wherein the vehicle control unit is configured to disconnect the connection between the DC converter and the main battery unit when the second battery reaches a predetermined discharge limiting state.

17. The electrified vehicle of claim 16, wherein the vehicle control unit is configured to control the main battery unit to independently supply power to the power electric unit when the DC converter and the main battery unit are disconnected.

18. The electrified vehicle of claim 14, wherein the vehicle control unit is configured to redetermine the target integrated voltage, when the additional step-up in the DC converter is possible.

19. The electrified vehicle of claim 11, wherein:
the swappable battery unit further comprises a cooling fan, and
the second battery management system is configured to control an operation of the cooling fan based on a temperature of the second battery and a vehicle speed as a voltage conversion through the DC converter is performed.

* * * * *